(12) United States Patent
Miller et al.

(10) Patent No.: US 10,355,731 B1
(45) Date of Patent: Jul. 16, 2019

(54) ISOLATING CONNECTOR MODULE FOR RUGGEDIZED MOBILE DEVICE

(71) Applicant: MobileDemand LC, Hiawatha, IA (US)

(72) Inventors: Matthew D. Miller, Cedar Rapids, IA (US); Steven R. Kunert, Cedar Rapids, IA (US)

(73) Assignee: MobileDemand LC, Hiawatha, IA (US)

( * ) Notice: Subject to any disclaimer, the term of this patent is extended or adjusted under 35 U.S.C. 154(b) by 0 days.

(21) Appl. No.: 16/029,128

(22) Filed: Jul. 6, 2018

Related U.S. Application Data

(63) Continuation-in-part of application No. 15/422,239, filed on Feb. 1, 2017, now Pat. No. 10,021,237.

(60) Provisional application No. 62/289,822, filed on Feb. 1, 2016.

(51) Int. Cl.
  *H04M 1/725* (2006.01)
  *H04B 1/3877* (2015.01)
  *H04B 1/3888* (2015.01)

(52) U.S. Cl.
  CPC ......... *H04B 1/3877* (2013.01); *H04B 1/3888* (2013.01); *H04M 1/72527* (2013.01)

(58) Field of Classification Search
  CPC .......... H04B 1/3888; H04B 2001/3894; A45C 2011/002; A45C 11/00; A45C 2011/003; A45C 2011/001; A45C 11/321; A45C 13/008; A45C 13/02; A45C 2013/1015; A45F 2200/0516; A45F 5/02; A45F 2005/026; A45F 5/00; A45F 2003/142; A45F 2003/146; A45F 2005/006; A45F 2005/008; A45F 2005/025; A45F 2200/0525; H04M 1/185; H04M 1/04; H04M 1/0254; H04M 1/0283; H04M 1/21; H04M 1/72527; H04M 1/0202; H04M 1/0249; H04M 1/0266; H04M 1/0274; H04M 1/03; H04M 1/035; H04M 1/18; H04M 1/72533; H04M 1/72575; H04M 2250/02
  See application file for complete search history.

(56) References Cited

U.S. PATENT DOCUMENTS

| 7,249,978 B1 | 7/2007 | Ni | |
| 9,438,295 B1 * | 9/2016 | Song | H04B 1/3888 |
| 2005/0085278 A1 * | 4/2005 | Lin | H04B 1/3883 455/573 |
| 2008/0188270 A1 * | 8/2008 | Bjorklund | H04M 1/6058 455/569.1 |

(Continued)

*Primary Examiner* — Golam Sorowar
(74) *Attorney, Agent, or Firm* — Suiter Swantz pc llo

(57) ABSTRACT

An isolating connector device for connecting a mobile device to a vehicle-based network or device while protecting the mobile device from shock or impact to the vehicle includes a nearside housing and farside housing connected by a shielded cable, the farside housing engaging with the vehicle-based network via USB or cable port. The nearside housing is dockable to the mobile device via 10-pin or like docking connector. The nearside housing also includes embedded magnets and spring-loaded guide pins to removably secure the nearside housing to the mobile device or its protective case and maintaining the docking connection. The nearside housing includes LEDs or like visual indicators of charging or data links provided to the mobile device via the docking connection.

8 Claims, 8 Drawing Sheets

(56) References Cited

U.S. PATENT DOCUMENTS

| | | | |
|---|---|---|---|
| 2010/0262845 A1* | 10/2010 | Goel | G06F 11/1456 |
| | | | 713/300 |
| 2012/0302288 A1* | 11/2012 | Born | H04M 1/04 |
| | | | 455/557 |
| 2014/0152890 A1 | 6/2014 | Rayner | |
| 2015/0201723 A1 | 7/2015 | Rayner et al. | |
| 2016/0172883 A1* | 6/2016 | Globerson | H02J 7/0044 |
| | | | 320/115 |

* cited by examiner

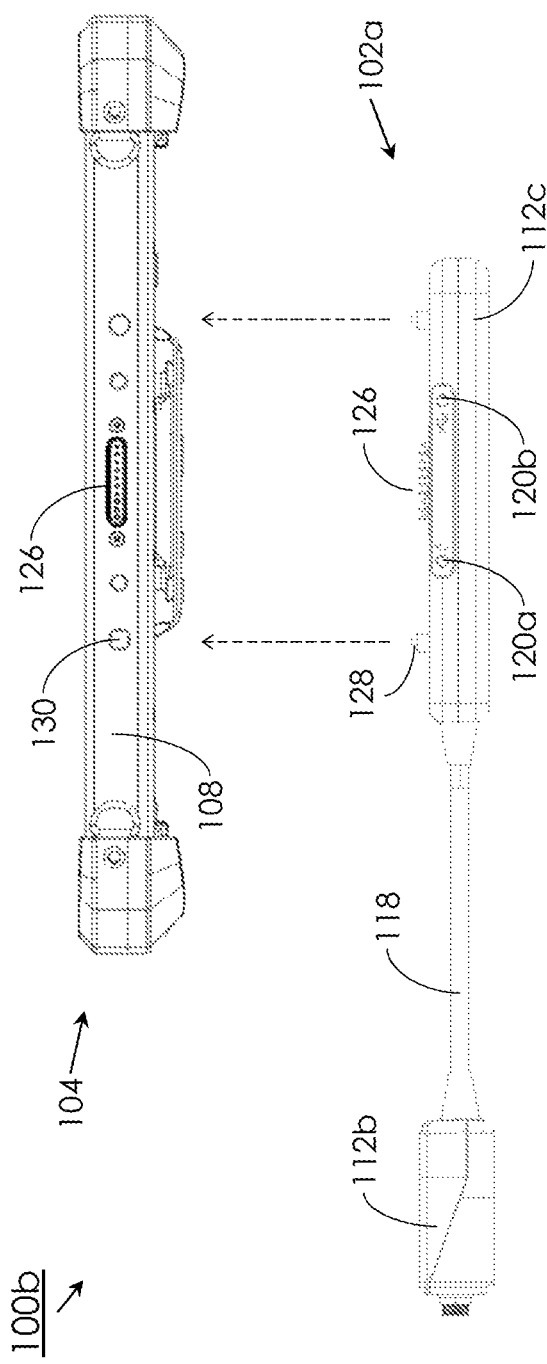
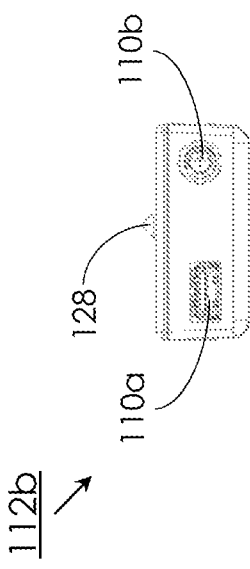
FIG. 7A
FIG. 7B

ISOLATING CONNECTOR MODULE FOR RUGGEDIZED MOBILE DEVICE

CROSS-REFERENCE TO RELATED APPLICATIONS

The instant application claims priority under 35 U.S.C. § 120 as a continuation-in-part of co-pending U.S. patent application Ser. No. 15/422,239, filed Feb. 1, 2017, entitled ISOLATING CONNECTOR MODULE FOR RUGGEDIZED MOBILE DEVICE. The instant application claims priority under 35 U.S.C. § 119(e) to provisional U.S. Patent Application Ser. No. 62/289,822, filed on Feb. 1, 2016. Said U.S. patent application Ser. No. 15/422,239 and 62/289,822 are herein incorporated by reference in their entirety.

BACKGROUND

Mobile communications devices, such as tablets or smartphones, may be mounted to a dashboard or other interior surface of a vehicle for hands-free use, in the sense that a user may use the device (e.g., via a touchscreen) without the need to manually support the device. However, the vehicle interior may be subject to significant vibrations and shocks. While vibrations, e.g., while the vehicle is idling, may make it difficult for the user to make accurate contact with a desired portion of the touchscreen. Furthermore, if the mobile device is connected to a network via a cable, port, or other physical link, the sustained vibrations and shocks may dislodge the link from its port or even damage both the link and the port.

SUMMARY

In a first aspect, embodiments of the inventive concepts disclosed herein are directed to an isolating connector device for securely docking a ruggedized mobile communications or computing device (e.g., smartphone, tablet, phablet) to a vehicle-based network or computing device (e.g., secured to a dashboard or other interior surface of the vehicle via a vehicle mount). The isolating connector module includes a far-side housing and a near-side housing connected by a shielded cable, the near-side housing nearest to, and engaging with, the mobile device and the far-side housing engaging with the vehicle-based network via a USB port, coaxial cable port, or other like serial port. In this way the near-side housing and mobile device may be isolated and protected from shock or impact to the vehicle or the vehicle mount. The near-side housing includes a contact surface with one or more magnets set beneath the surface to engage and secure the near-side housing to the mobile device or a protective housing or case surrounding the mobile device. The contact surface includes a 10-pin or like docking connector pluggable into a corresponding docking port on the corresponding exterior surface of the mobile device to establish the docking connection. The contact surface includes spring-loaded guide pins that deploy into matching guide holes or slots on the exterior surface of the mobile device, such that the near-side housing is removably secured to the mobile device. The near-side module may include visual indicators of a charge or data link delivered to the mobile device via the docking connection.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7A is an exploded view of the mobile device and isolating connector device of FIG. 6;

FIG. 7B is an isolated view of the far-side module housing of the isolating connector device of FIG. 7A;

DETAILED DESCRIPTION OF EXEMPLARY EMBODIMENTS

Embodiments of the inventive concepts disclosed herein are directed to an apparatus for connecting a mobile device such as a tablet, smartphone, or any other similar mobile communications or computing device to a vehicle-based network and protecting the connection and its related hardware components from vehicle-related shock and vibration.

Figure 1:
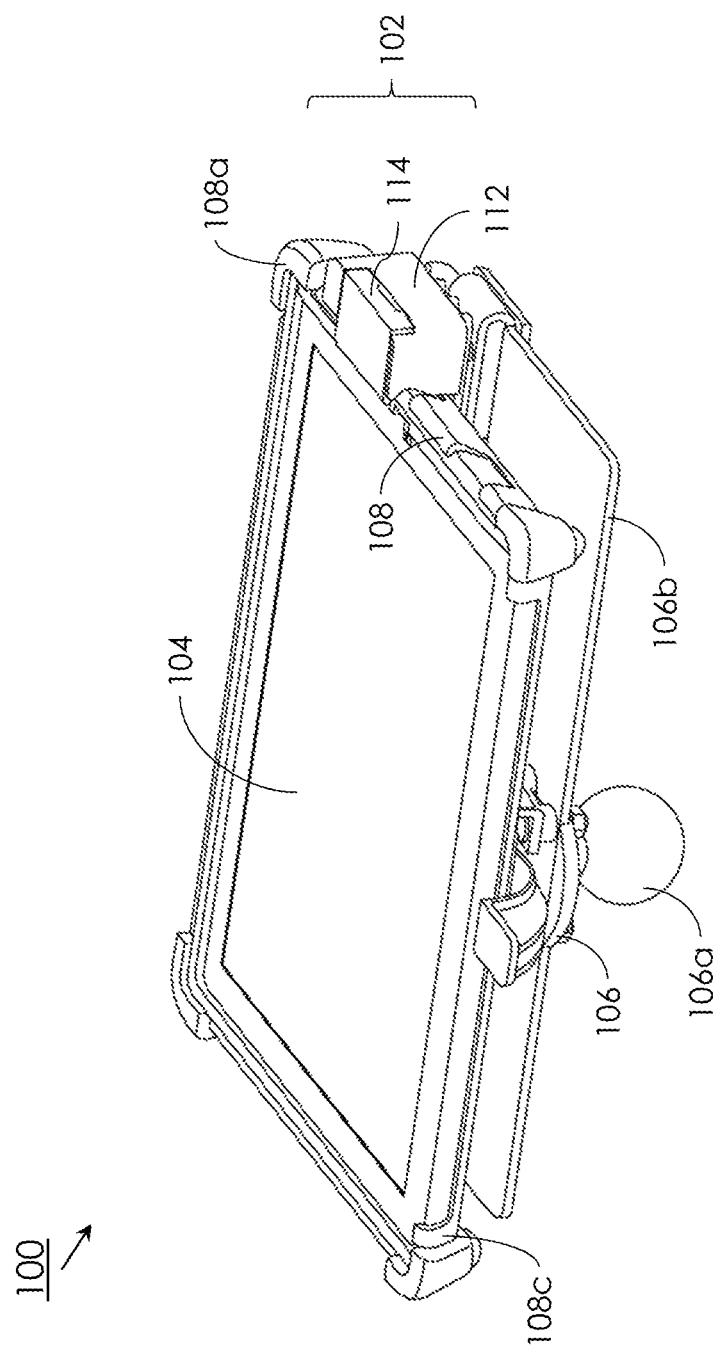
FIG. 1 is a front three-quarter view of an exemplary embodiment of an apparatus for connecting a mobile device according to embodiments of the inventive concepts disclosed herein, the apparatus in a closed state.
Figure 3:
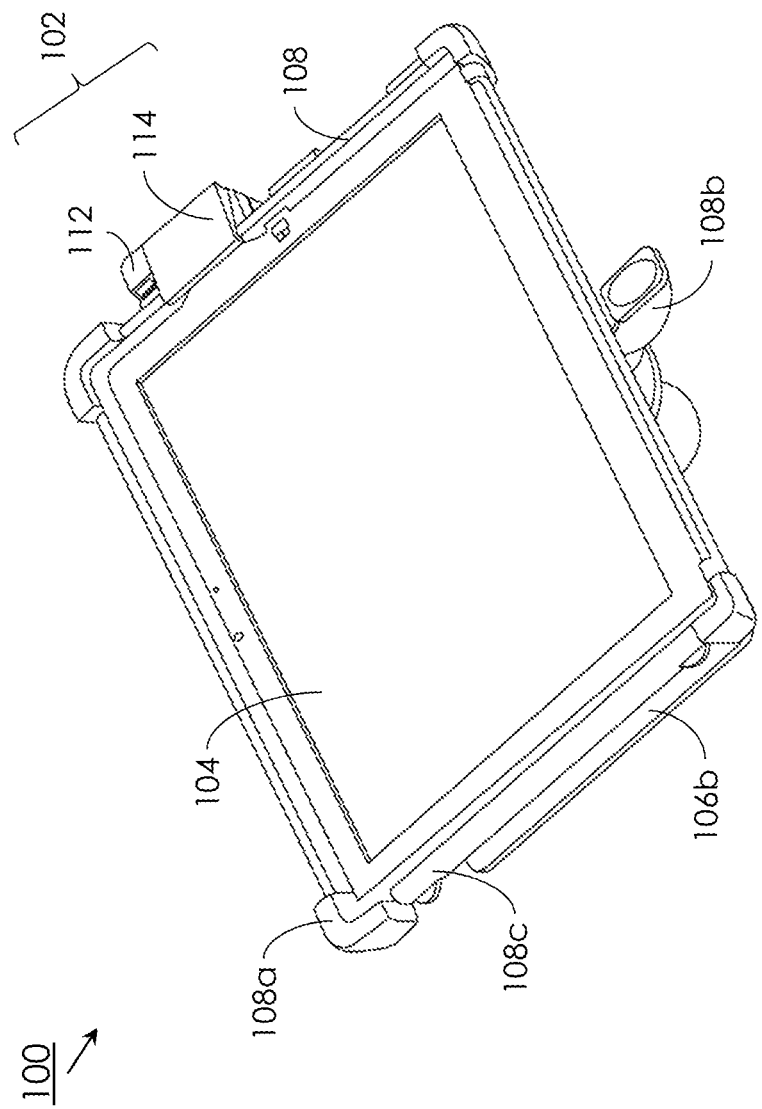
FIG. 3 is an overhead view of the apparatus of FIG. 1.

Referring to FIGS. 1 and 3, a system 100 according to the inventive concepts disclosed herein may comprise a connector module 102 couplable to a mobile device 104, such as a tablet or smartphone. The mobile device 104 may in turn be mounted to a vehicle (e.g., to a dashboard or other like interior surface of the vehicle, for use while inside the vehicle) via a vehicle mount 106. The mobile device 104 may be ruggedized for heavy-duty use; for example, the mobile device may be enclosed in a multipart protective housing to guard against impact shock or damage to the mobile device, its touchscreen, or its components and peripherals from extreme temperatures or precipitation. The protective housing (108) may include a rigid component (108a) fashioned of a high-impact plastic or similar rigid material and reinforced around the corners of the mobile device. The rigid component 108a may further include a support bracket (108b) for supporting the mobile device 104 by an edge while the mobile device is mounted to the vehicle interior (via the vehicle mount 106). The support bracket 108b may further function as a handle, by which the user may direct the system 100 toward, or away from, him/herself by articulating the system 100 (provided the vehicle mount 106 is pivotably mounted to the dashboard, e.g., via a ball mount 106a). The housing 108 may include a flexible component 108c, fashioned from a rubberized, plastic, or otherwise flexible material configured for gripping by the user. For example, the flexible component 108c may partially or fully protect the edges of the mobile device 104, partially enclosing the rigid component 108a.

The vehicle mount 106 may include a mounting plate 106b to which the support bracket 108b and rigid component 108a (or the housing 108 generally) may be attached. As the mounting plate 106b, and the vehicle mount 106 generally, may be directly connected to the dashboard (via the ball mount 106a), the shock of any impact upon the vehicle (e.g., uneven roads or potholes) as well as vibrations associated with the operation of the vehicle may be conducted by the vehicle mount to the mobile device 104. For example, the mobile device 104 may establish a wireless link to a fleet-wide network based on Bluetooth or another wireless protocol (e.g., to a stronger wireless receiver located within the vehicle); if the mobile device 104 is not itself Bluetooth-compatible, the wireless link may require an external adapter connected to the mobile device via, for example, a USB port of the mobile device 104. Alternatively, the network link may be a physical link established via the USB port. Shock and vibration may dislodge a USB-connected device from the USB port, and may even damage one or both of the USB connector and its corresponding port in the mobile device 104.

Figure 2:
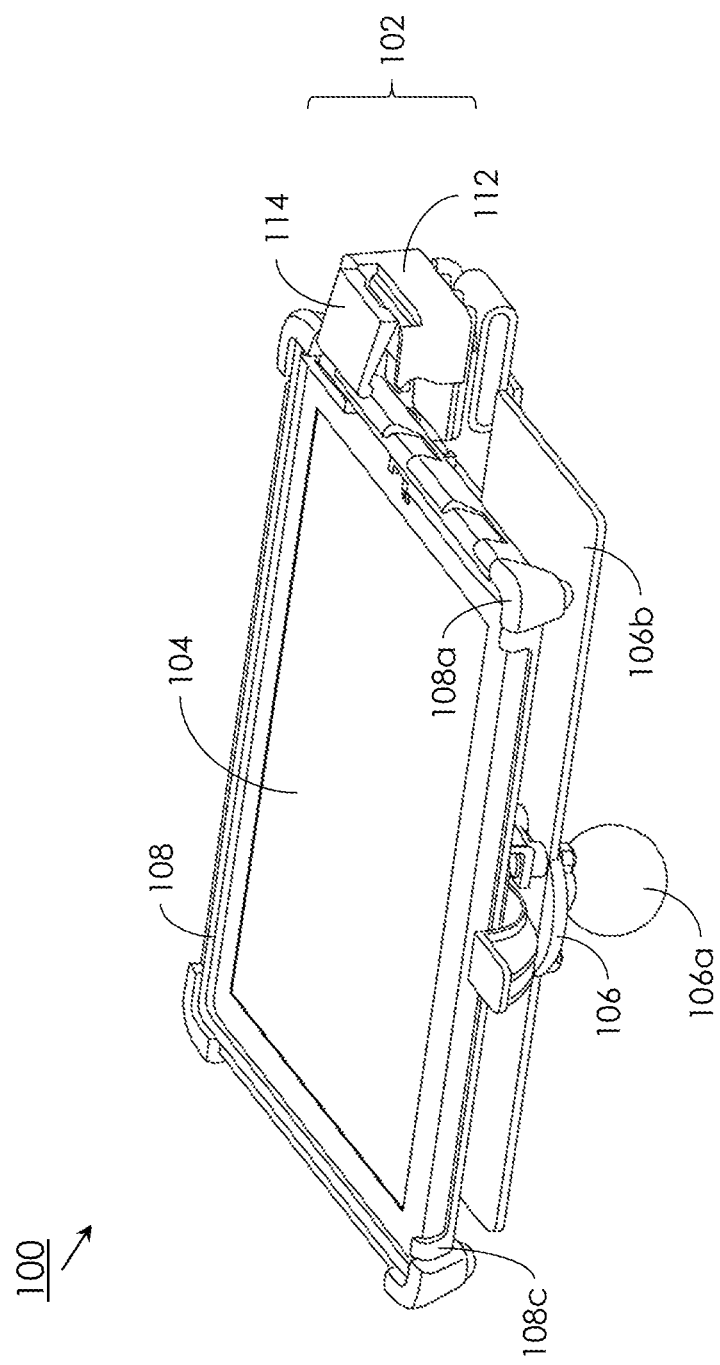
FIG. 2 is a front three-quarter view of the apparatus of FIG. 1 in an open state.
Figure 4:
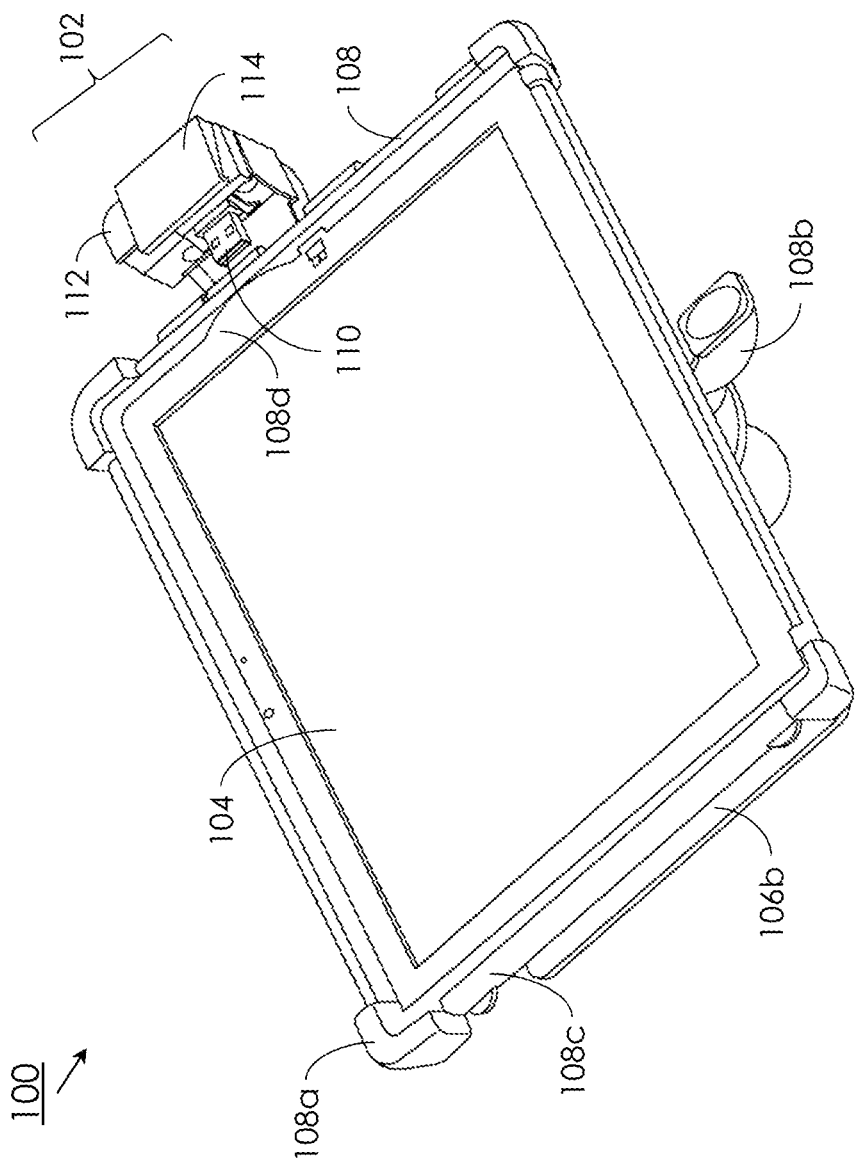
FIG. 4 is an overhead view of the apparatus of FIG. 2.

Referring also to FIGS. 2 and 4, the connector module 102 may include a USB connector (110) encased in a protective module housing 112. The module housing 112 may additionally enclose a wireless connector, such as a Bluetooth adapter, for establishing a wireless link to a mobile device 104 connected to the connector module 102 via the USB connector 110. The module housing 112 may include a protective panel (114) that serves as an access door to the USB connector 110. The protective panel 114 may be hinged so as to swing open or closed, the USB connector 110 being visible while the connector module 102 is in the open state. The USB connector 110, plugged into the corresponding USB port of the mobile device 104, may be secured in place by closing the protective panel 114. Referring particularly to FIG. 3, the protective panel may engage with the housing 108 of the mobile device 104 to hold the USB connector 110 in place; for example, the rigid component 108a may include a recess (108d) configured to accept the protective panel 114. In order to disengage the USB connector 110 from the corresponding USB port, the user must first unbuckle the protective panel 114 from the housing 108 of the mobile device 104.

Referring back to FIGS. 1 and 2, the connector module 102 may include an impact absorber 116. The impact absorber 116 may be a flexible and pliable component including multiple layers folded over themselves and positioned between the module housing 112 and the mounting plate 106b. The impact absorber 116 may be configured to isolate the connector module 102 from vibrations or shocks conducted by the mounting plate 106b by deforming in response to the vibrations or shocks. The impact absorber may have a substantially annular shape, comprising a ring or open-ended cylinder of rubber, or a synthetic rubberized material, having a Shore hardness between 40 A and 70 A. In a preferred embodiment, the impact absorber 116 is fashioned of material having a Shore hardness of 60 A.

Figure 5:
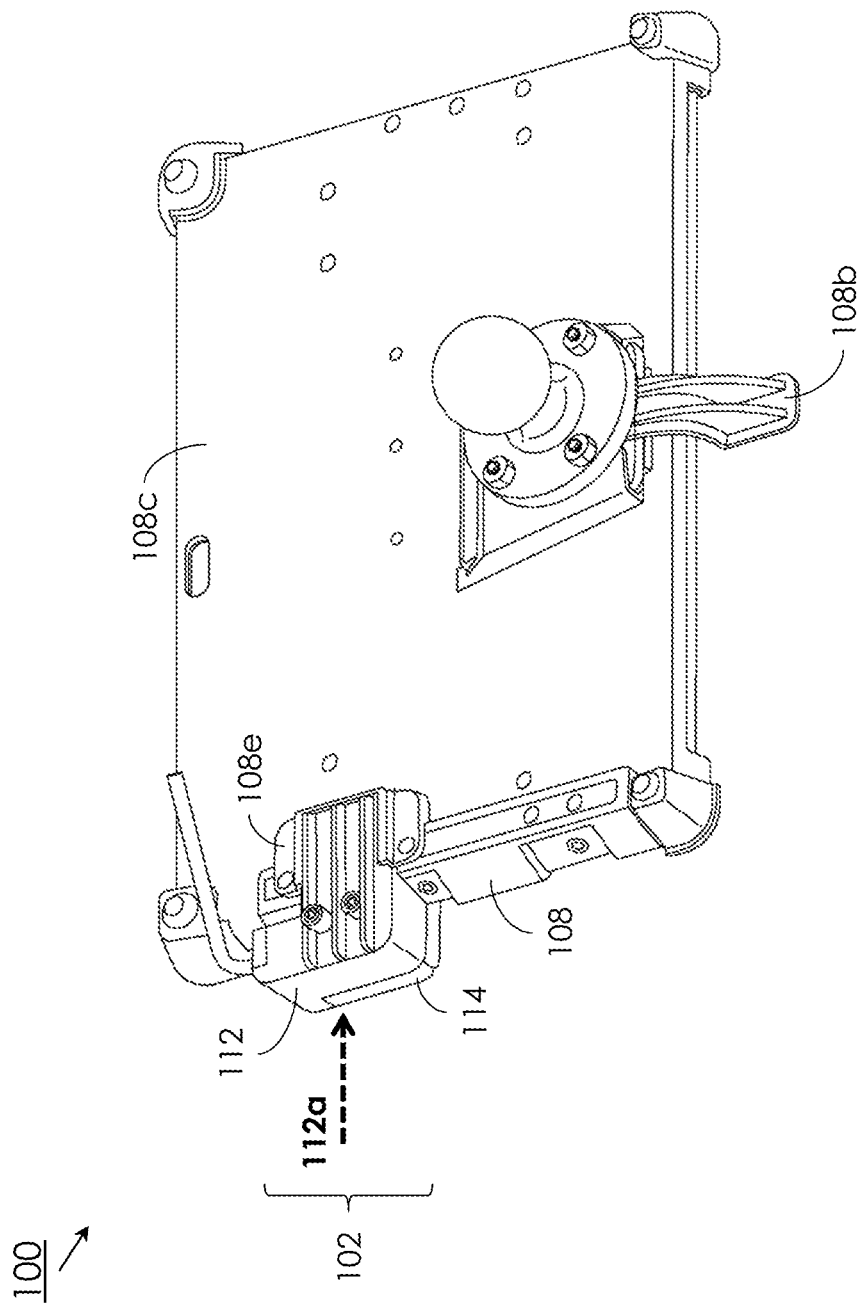
FIG. 5 is an underside view of the apparatus of FIG. 1.

Referring to FIG. 5, the connector module 102 may be removably attached to the housing 108 of the mobile device 104. For example, the rigid component 108a may include an insertion slot (108e) with which the module housing 112 may slidably engage (112a) to attach or detach the connector module 102 from the housing 108.

Figure 6:
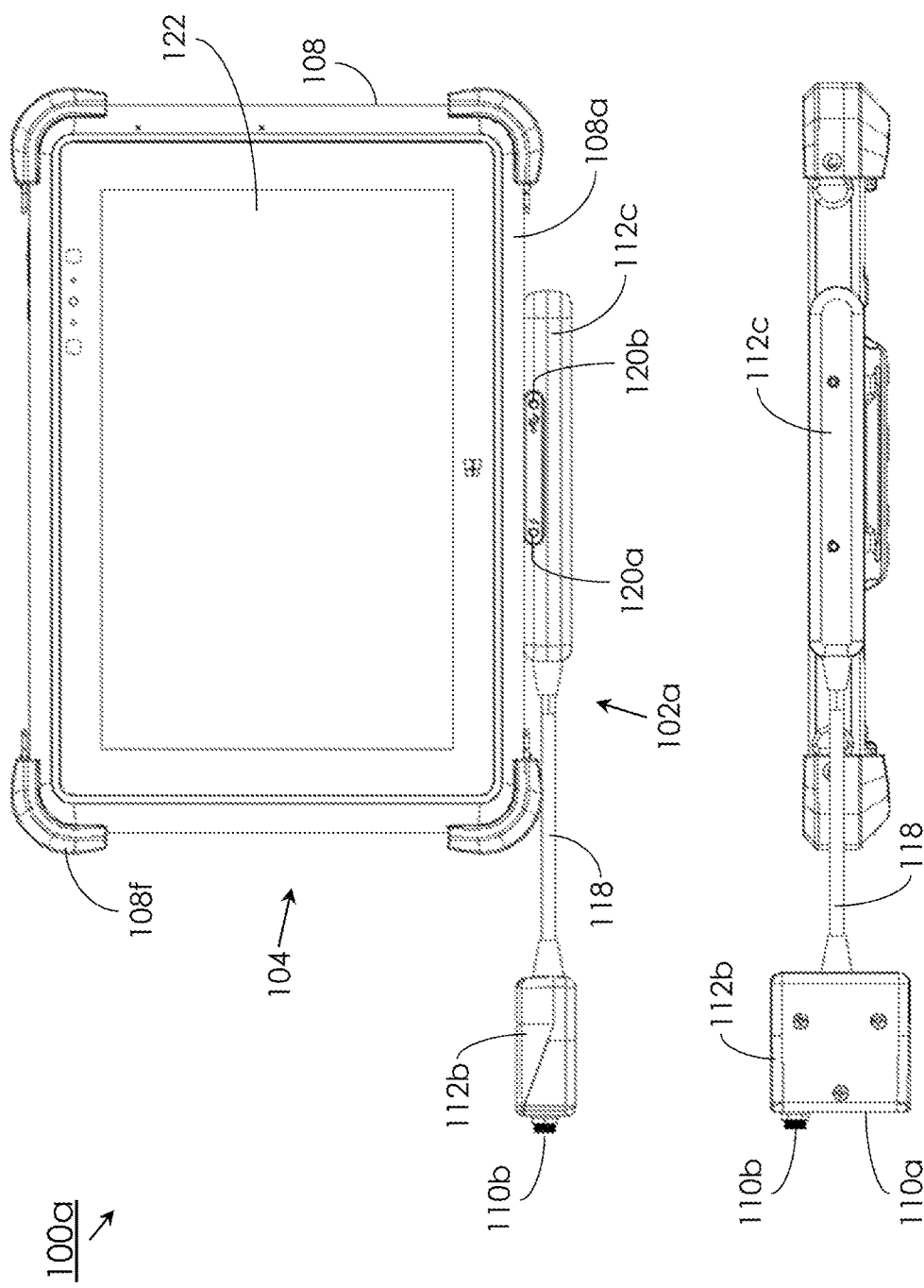
FIG. 6 is a forward view and an underside view of a mobile device and an exemplary embodiment of an isolating connector device according to embodiments of the inventive concepts disclosed herein.

FIG. 6—Isolating Connector Module

Referring to FIG. 6, the system 100a may be implemented and may function similarly to the system 100 of FIGS. 1 through 5, except that the system 100a may incorporate an isolating connector module 102a that protects a connected mobile device 104 and a connection linking the mobile device to another device, port or network (e.g., via a USB connector 110 (USB 2.0, USB 3.0), a coaxial or other cable connector 110a, a serial port connector, or any appropriate similar connector) from impact and shock by separating the USB connector 110 and cable connector 110a (and its far-side module housing 112b) from a near-side module housing 112c directly connected to the mobile device 104. For example, the near-side module housing 112c and far-side module housing 112b (e.g., "near" and "far" relative to the mobile device 104) may be connected by a cable 118 (e.g., coaxial cable, shielded cable). The cable 118 may be of sufficient length to allow another device or network (via the device) to plug into the far-side module housing 112b while allowing the mobile device 104 to be mounted (e.g., to a vehicle mount 106 as shown by FIGS. 1 and 3) with some freedom of pivotal or rotational movement as needed.

The near-side module housing 112c may secure to an exterior surface of the mobile device 104, either directly or via a protective housing 108 at least partially enclosing the mobile device. For example, a rigid component 108a of the protective housing 108, which may protect the edges and rear face of the mobile device 104 and which may include partially flexible reinforced corners (108f), may be configured to accept the near-side module housing 112c and thereby connect the isolating connector module 102a to the mobile device 104. The near-side module housing 112c may further include one or more indicators 120a-b positioned so as to be clearly visible to a viewer of the display surface (122) of the mobile device. For example, the indicator 120a may be a light-emitting diode (LED) or similar luminous device indicating, when lit, an active state of a charging connection via which power is provided to the mobile device 104 via the isolating connector device 102a. Similarly, the indicator 120b may show, when lit, an active state of a data link to the mobile device 104 via the isolating connector device 102a.

FIGS. 7A/D—Isolating Connector Module

Referring to FIGS. 7A through 7D, the system 100b may be implemented and may function similarly to the system 100a of FIG. 6, except that the system 100b may include a mobile device 104 configured, e.g., on an edge or an exterior surface of a protective housing 108 at least partially enclosing the mobile device, to accept the near-side module housing 112c.

For example, referring in particular to FIGS. 7A and 7B, a portion of the exterior surface of the mobile device 104 or protective housing 108 may include a 10-pin port (124) or other like serial port configured to accept a corresponding serial connector (126) set into the near-side module housing 112c. The near-side module housing 112c may include one or more spring-loaded guide pins (128) configured to fit corresponding guide holes or slots (130) in the exterior surface and secure the near-side module housing 112c thereto.

Figure 7C:
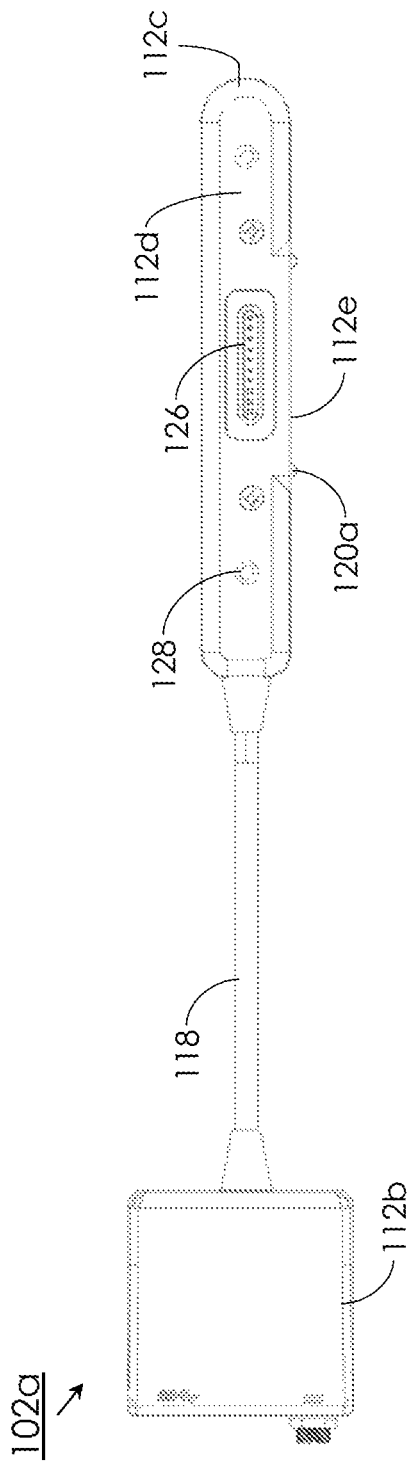
FIG. 7C is a rotated view of the isolating connector device of FIG. 7A.

Referring in particular to FIG. 7C, the near-side module housing 112c may include a contact surface (112d) in direct contact with the exterior surface of the mobile device 104 or protective housing 108 when the near-side module housing 112c is connected to the mobile device (as shown by FIG. 6). For example, the contact surface 112d may be adjacent to the surface (112e) into which the indicators 120a-b are set.

Figure 7D:
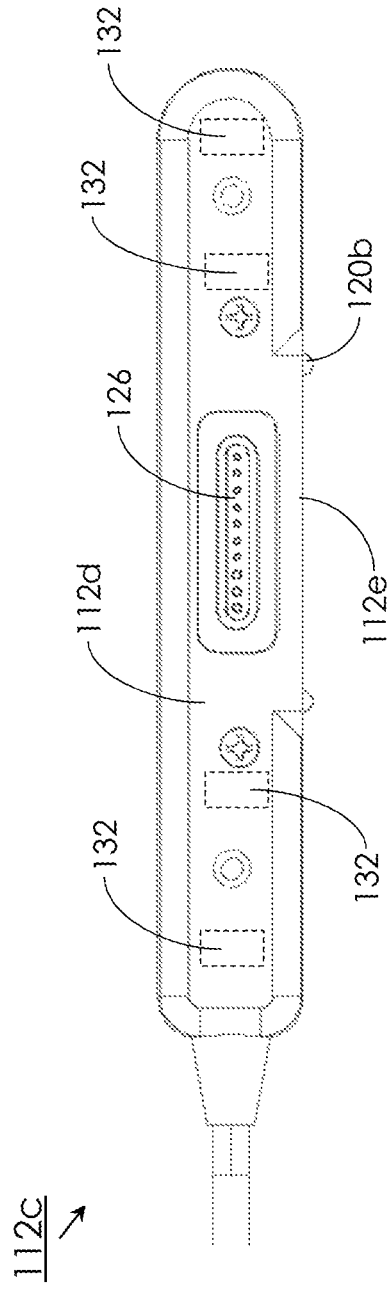
FIG. 7D is an isolated view of the near-side module housing of FIG. 7C.

Referring also to FIG. 7D, the near-side module housing surface 112d may include magnets (132) embedded beneath the contact surface 112d. The magnets 132 may be capable of attracting (through the contact surface 112d) similarly partially magnetized portions (not shown) of the exterior surface of the mobile device 104 or protective housing 108. In this way, the near-side module housing 112c may be naturally attracted into a position wherein the serial connector 126 may engage the 10-pin port 124 and the guide pins 128 may engage their corresponding guide holes 130, securing the near-side module housing 112c into place against the mobile device or protective housing.

We claim:

1. An isolating connector device, comprising:
a first connecting portion and a second connecting portion connected by a cable;
the first connecting portion comprising at least one serial port capable of engaging a serial connector of a first computing device;
the second connecting portion configured to establish a connection to a mobile computing device and comprising:
a housing connected to the cable and having at least a first surface and a second surface, the first surface configured to engage an exterior surface of the mobile computing device, the housing including at least one magnet disposed beneath the first surface and configured to attract the exterior surface;
at least one docking connector set into the first surface and configured to establish the connection by engaging with a docking port of the exterior surface;
one or more spring-loaded guide pins set into the first surface, each guide pin configured to engage with a corresponding guide hole of the exterior surface; and
one or more indicators set into the second surface, each indicator configured to visually display a state of the connection.

2. The isolating connector device of claim 1, wherein the serial port includes at least one of a USB port and a cable port.

3. The isolating connector device of claim 1, wherein the one or more indicators include at least one light-emitting diode (LED).

4. The isolating connector device of claim 1, wherein the one or more indicators include at least one of a first indicator corresponding to a charging connection and a second indicator corresponding to a data connection.

5. The isolating connector device of claim 1, wherein the exterior surface is associated with a protective housing at least partially enclosing the mobile computing device.

6. The isolating connector device of claim 1, wherein the second connecting portion further comprises a wireless connector associated with at least one wireless protocol, the wireless connector configured to connect the mobile computing device to at least one network via the wireless protocol.

7. The isolating connector device of claim 6, wherein the at least one wireless protocol includes Bluetooth.

8. The isolating connector device of claim 1, wherein the docking connector includes a 10-pin connector.

* * * * *